(12) United States Patent
Wang et al.

(10) Patent No.: US 10,701,179 B2
(45) Date of Patent: Jun. 30, 2020

(54) ADAPTIVE SCORING OF SERVICE REQUESTS AND DETERMINING WHETHER TO FULFILL SERVICE REQUESTS

(71) Applicant: Oath Inc., New York, NY (US)

(72) Inventors: Liang Wang, San Jose, CA (US); Xianen Qiu, Sunnyvale, CA (US); Chun Han, Fremont, CA (US); Yan Han, Champaign, IL (US); Ruichen Wang, Urbana, IL (US)

(73) Assignee: Oath Inc., New York, NY (US)

( * ) Notice: Subject to any disclaimer, the term of this patent is extended or adjusted under 35 U.S.C. 154(b) by 111 days.

(21) Appl. No.: 15/800,159

(22) Filed: Nov. 1, 2017

(65) Prior Publication Data

US 2019/0132419 A1    May 2, 2019

(51) Int. Cl.
*G06F 13/00*     (2006.01)
*H04L 29/08*     (2006.01)
*H04L 12/24*     (2006.01)
*G06F 9/50*      (2006.01)

(52) U.S. Cl.
CPC ........ *H04L 67/322* (2013.01); *H04L 41/5006* (2013.01); *H04L 67/30* (2013.01); *G06F 9/5038* (2013.01); *H04L 41/5003* (2013.01)

(58) Field of Classification Search
CPC ...... G06F 13/00; G06F 9/4881; G06F 9/5038; G06Q 10/107; H04L 12/58; H04L 12/581; H04L 12/585; H04L 12/5695; H04L 12/5855; H04L 29/06; H04L 29/08071; H04L 29/08072; H04L 29/08172; H04L 29/08144; H04L 29/08; H04L 29/0809; H04L 41/08; H04L 41/102; H04L 41/5003; H04L 41/5006; H04L 63/5003; H04L 63/5006; H04L 67/30; H04L 67/322
USPC ........................................ 709/206, 207, 226
See application file for complete search history.

(56) References Cited

U.S. PATENT DOCUMENTS

| 7,610,342 | B1 * | 10/2009 | Pettigrew | G06Q 10/107 709/206 |
|---|---|---|---|---|
| 2005/0071432 | A1 * | 3/2005 | Royston, III | G06F 21/55 709/206 |
| 2006/0168041 | A1 * | 7/2006 | Mishra | H04L 29/1215 709/206 |
| 2006/0256012 | A1 * | 11/2006 | Fok | G06F 21/56 342/457 |

(Continued)

*Primary Examiner* — Robert B Harrell
(74) *Attorney, Agent, or Firm* — Cooper Legal Group, LLC

(57) ABSTRACT

Services often utilize scoring techniques to distinguish between user requests that comply with a usage policy of the service from those that represent a misuse of the service. Users who endeavor to misuse the service engages in probing by submitting a variety of requests to the service until one such request exhibiting a score that is within a score threshold, and then patterning further requests that misuse the service upon the successful request. Instead, when a first request from a user is identified that violates the score threshold, a score offset is selected. The scores of second and future requests by the user are adjusted by the score offset, indicating increased suspicion of the user's requests, while allowing legitimate requests that fulfill the score threshold by a larger margin. Additionally, absent further misuse, the score offset decays over time to restore trust incrementally in the legitimacy of the user's requests.

20 Claims, 10 Drawing Sheets

(56) References Cited

U.S. PATENT DOCUMENTS

2007/0061404 A1\* 3/2007 Maller ................... H04L 51/12
709/206

\* cited by examiner

ADAPTIVE SCORING OF SERVICE REQUESTS AND DETERMINING WHETHER TO FULFILL SERVICE REQUESTS

BACKGROUND

Within the field of computing, many scenarios involve the provision of services such as email, file sharing, web access, and access to accounts through mechanisms such as passwords. Many such services are provided to users according to a usage policy that describes acceptable uses and unacceptable uses of the service. As a first example, the usage policy for an email service may prohibit the transmission of bulk unsolicited email ("spam" messages). As a second example, the usage policy for a web service may prohibit access in an automated manner, which may lead to an overconsumption of computing resources that may limit the provision of the service to other users and/or inflate the infrastructure costs of providing the service. As a third example, services that protect sensitive resources through a login interface my prohibit users from attempting to guess passwords of other users and resources, such as brute-force guessing of usernames and passwords.

In order to enforce such policies, many services utilize a variety of heuristic techniques to detect misuse. Some heuristics may involve extracting quantitative and statistical data characteristics, such as monitoring the rate at which users are sending email, consuming bandwidth, and/or submitting login attempts. Some data analysis systems utilize background knowledge to evaluate such attempts, such as known patterns of activity that may indicate misuse. For example, unsolicited bulk messaging may utilize a recognizable set of email message templates that persuade recipients to read the messages and/or respond to phishing attempts. An email service may use a content analysis system and/or a database of known templates in order to distinguish legitimate messages from spam. Additionally, as users who seek to misuse services develop new techniques such as new email templates, the heuristics of the data analysis systems may have to adapt to new information or emerging patterns, which may be achieved through management by a human administrator or a refresh of the data analysis model.

When a heuristic analysis technique of a service detects user activity that appears to represent a misuse of the service, a variety of responses may be applied. As a first example, the activity may trigger an alarm, and/or present the activity suspected of violating the usage policy to an analyst for further review. As a second example, a misuse detection system may apply various penalties, such as blocking requests, locking accounts of malicious users such as spammers. As a third example, newly identified patterns of activity representing a misuse may yield information that may be utilized as historical data, e.g., to update the usage policy and/or to adapt the heuristic data analysis system to recognize the new patterns of activity.

SUMMARY

Many heuristic analysis techniques that review requested activities of services operate by outputting a score indicating a confidence level that the activity complies with the usage policy. Patterns of misuse may be identified and reduced by establishing thresholds, and then scoring user requests to detect when the score of a request fails the score threshold. For each request, the score may be compared with a score threshold that distinguishes between activities that are deemed to be appropriate and that are allowed from those that are deemed to be misuse and that are denied. Applying the heuristic to the full range of requested user activities may enable a server to limit the service to fulfill only the subset of requests that are determined to comply with the usage policy.

However, heuristics that culminate with the comparison of a score to a score threshold may be vulnerable to probing mechanisms. For example, a user may submit variations of a request to the service. Although the service may deny the first request, the user may incrementally adapt various aspects of the request (e.g., adjusting the content of a message template, and/or adjusting the timing of brute-force password attempts) until a variation is found that, according to the heuristic, yields scores that satisfy the score threshold. By such techniques, experienced users may deliberately probe the heuristic analysis systems to find a variation of the activity that is within the score threshold—e.g., submitting username and password guesses at a maximum of three times per minute. Although such activity may still violate the usage policy of the service, the activity may yield scores that are (perhaps barely) within the score threshold, and may therefore be permitted by the heuristic analysis system.

As another disadvantage of heuristic analysis systems, the rigidity of the score threshold comparison may inadvertently create false positives, where legitimate user activity may be incorrectly identified as a misuse of the service and unfairly penalized. For example, a user who utilizes many user accounts may not remember the password of a particular account, and when the user's password attempts fails a score threshold (e.g., more than three incorrect guesses in a minute), the service may indefinitely block the account. In such scenarios, the application of responsive techniques, such as blocking attempts and/or banning the user, may apply an overly assertive penalty to this activity—even if the user has a lengthy history of legitimate activity; even if the suspicious activity barely violates the score threshold (e.g., the score threshold may be established as identifying malicious requests as those yielding a score above 600, and the user's particular request may score 601).

Presented herein are techniques that enable servers to evaluate user activities, and to distinguish between legitimate requests and requests that do not comply with the usage policy of the service, in a more flexible manner than a fixed score threshold. In accordance with these techniques, for a first request, a service may determine a first score indicating whether the first request complies with a usage policy of the service, and may determine whether to fulfill the first request by comparing the first score with a score threshold. Responsive to the first score failing the score threshold, the service may initiate a score offset. For a second request (e.g., a subsequent or concurrent request by the same user, or by an apparently different user but involving the same resources), the service may determine a second score determined for the second request, and determine whether to fulfill the second request by comparing the second score adjusted by the score offset to the score threshold. Additionally, the service may decay the score offset over time.

Some embodiments of such techniques may discourage users who endeavor to misuse the service through probing. Such embodiments may persist the determination of past failures by the user to exploit the service (e.g., a pattern of recent failed attempts to log into a particular user account), and may persist a degree of suspicion in the user's historical pattern of requests as a measure of the degree of suspicion of the user's future requests.

As a first example, the variable nature of the comparison—where the score threshold determination of whether to allow or deny a request is based not only on the score of the individual request, but on the score offset that reflects a pattern of past requests—may at least partially obfuscate the user's determination of the score threshold, and the identification of requests that are likely to satisfy the score threshold even if applied in a template manner. As a second example, the decaying nature of the score offset may delay probing attempts to the point of frustrating, or at least delaying, the misuse of the service. Conversely, for users whose requests inadvertently fail the score threshold, the application of a score offset that is applied to the user's other requests may reduce the excessive application of penalties in cases of false positives; e.g., evaluating future requests by the user with a score offset that decays over time, rather than banning the user, may reduce the frustration of inadvertently penalizing legitimate users. Many such advantages may be achievable by applying score offsets to the evaluation of requests of service utilization in accordance with the techniques presented herein.

DESCRIPTION OF THE DRAWINGS

While the techniques presented herein may be embodied in alternative forms, the particular embodiments shown in the drawings are only a few such examples that are supplemental of the description provided herein. These embodiments are not to be interpreted as limiting any aspect of the invention, which is defined by the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and systems. Accordingly, this subject matter is not intended to be construed as limited to any example embodiments set forth herein; example embodiments are provided merely to be illustrative. Such embodiments may, for example, take the form of hardware, software, firmware or any combination thereof (other than software per se). A reasonably broad scope for claimed or covered subject matter is intended.

1. Computing Scenario

The following provides a discussion of some types of computing scenarios in which the disclosed subject matter may be utilized and/or implemented.

1.1. Networking

Figure 1:
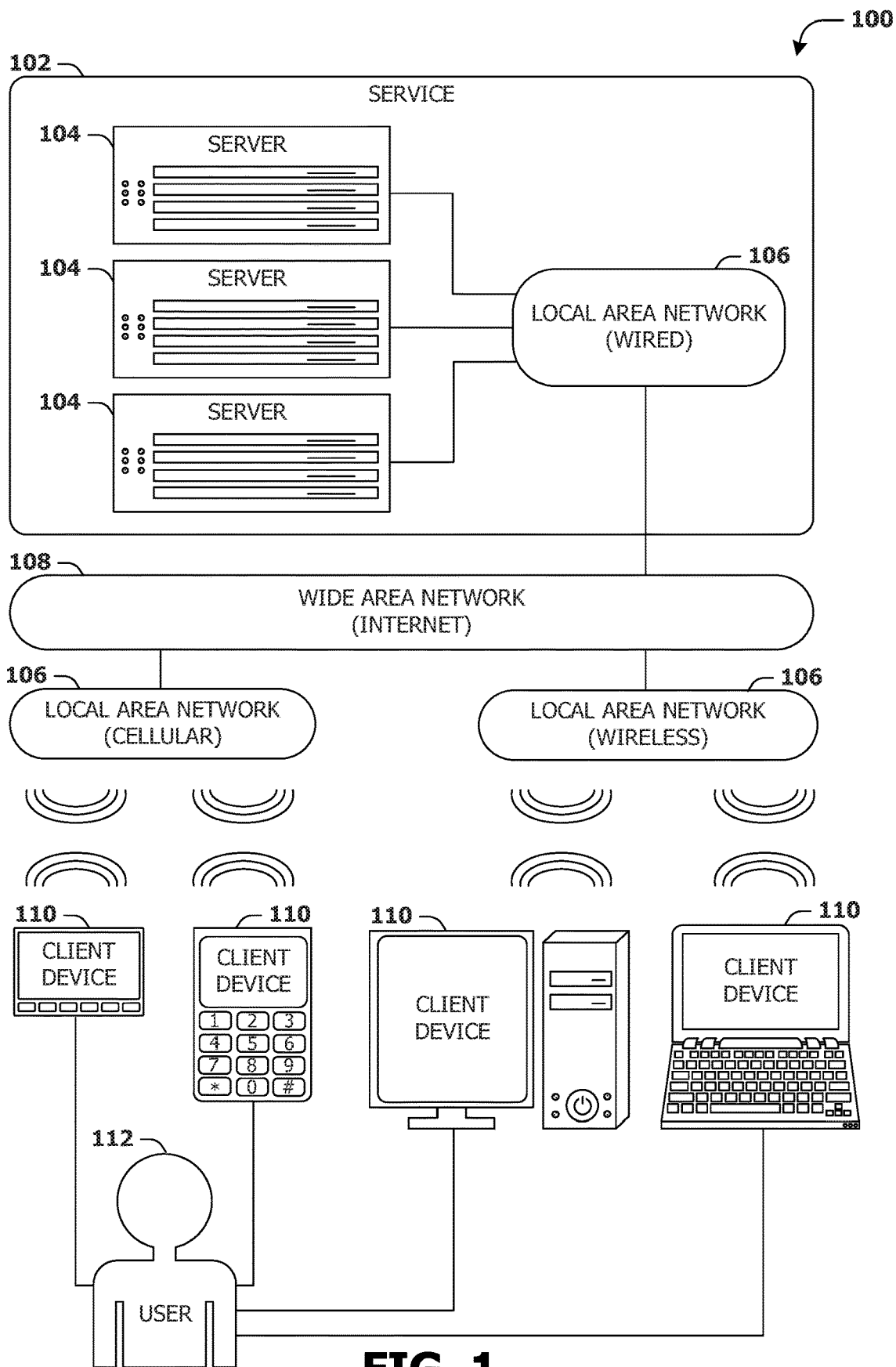
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may also be interconnected directly, or through one or more other networking devices, such as routers, switches, and repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may also include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and mesh architectures, and/or also a variety of roles, such as administrative servers, authentication servers, security monitor servers, data stores for objects such as files and databases, business logic servers, time synchronization servers, and front-end servers providing a user-facing interface to the service 102.

Likewise, the local area network 106 may comprise one or more sub-networks, such as may employ differing architectures or may be compliant or compatible with differing protocols, may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and client devices 110. The wide area network 108 may encompass various combinations of devices with varying levels of distribution and exposure, such as a public wide-area network (e.g., the Internet), or a private network (e.g., a virtual private network (VPN) of a distributed enterprise).

In the scenario 100 of FIG. 1, the service 102 may be accessed via the wide area network 108 by a user 112 of a set of client devices 110, such as a portable media player (e.g., an electronic text reader, an audio device, or a portable gaming, exercise, or navigation device); a portable communication device (e.g., a camera, a phone, or a text chatting device); a workstation; and a laptop form factor computer. The respective client devices 110 may communicate with the service 102 via various connections to the wide area network 108. As a first such example, one or more client devices 110 may comprise a cellular adapter 306, and may connect to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
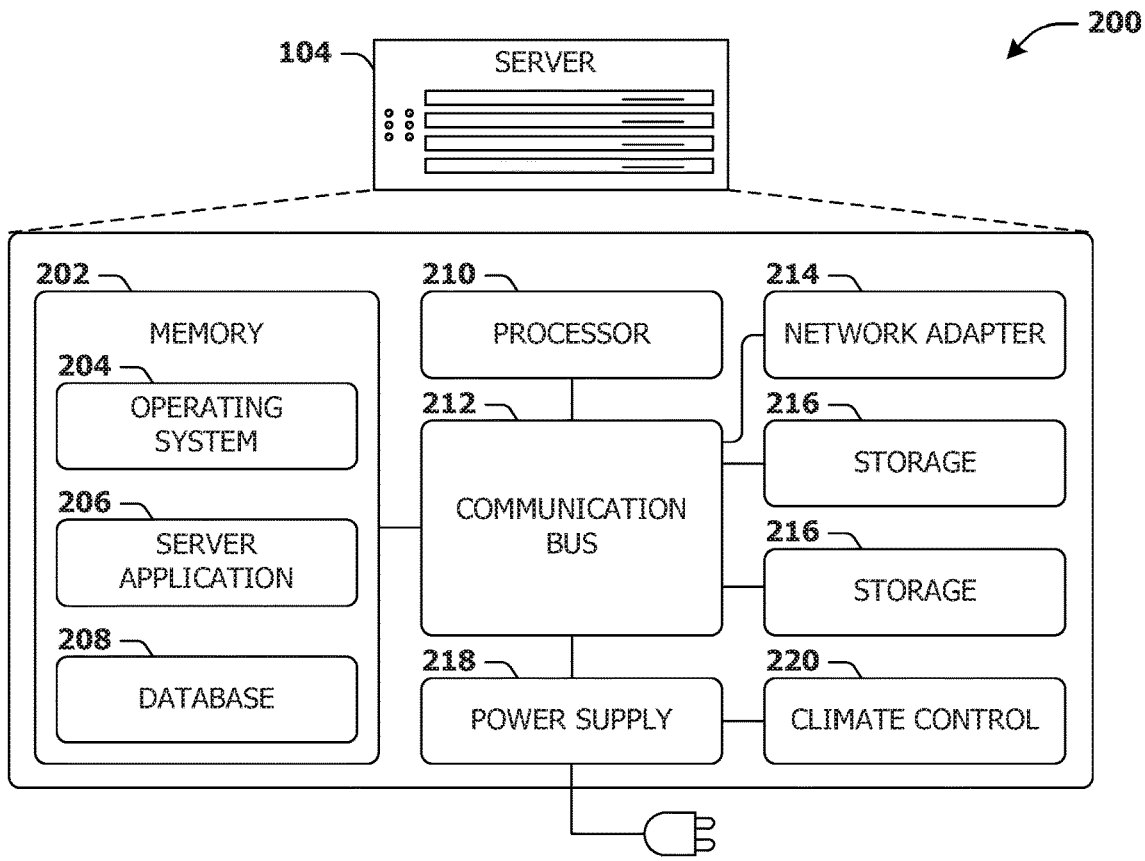
FIG. 2 is an illustration of a scenario involving an example configuration of a server that may utilize at least a portion of the techniques presented herein.

FIG. 2 presents a schematic architecture diagram 200 of a server 104 that may utilize at least a portion of the techniques provided herein. Such servers 104 may vary widely in configuration or capabilities, alone or in conjunction with other servers 104, in order to provide a service 102.

A server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. A server 104 may also comprise a memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may also comprise a variety of peripheral components, such as a wired and/or wireless network adapter 214 connectable to a local area network 106 and/or wide area network 108; one or more storage components 216, such as a hard disk drive, a solid-state storage device (SSD), a flash memory device, and/or a magnetic and/or optical disk reader. The server 104 may also comprise a mainboard featuring one or more communication buses 212 that interconnect the processor 210, the memory 202, and various peripherals, using a variety of bus technologies, such as a variant of a serial or parallel AT Attachment (ATA) bus protocol; the Uniform Serial Bus (USB) protocol; and the Small Computer System Interface (SCI) bus protocol. In a multibus scenario, one or more communication buses 212 may interconnect the server 104 with at least one other server 104. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

A server 104 may also operate in various physical enclosures, such as a desktop or tower, and/or may be integrated with a display as an "all-in-one" device. A server 104 may also be mounted horizontally and/or in a cabinet or rack, and/or may simply comprise an interconnected set of components. A server 104 may also comprise a dedicated and/or shared power supply 218 that supplies and regulates power for the other components. The server 104 may also provide power to and/or receive power from another server 104 and/or other devices. The server 104 may also comprise a shared and/or dedicated climate control unit 220 that regulates climate properties, such as temperature, humidity, and airflow. Many such servers 104 may be configured and/or adapted to utilize at least a portion of the techniques presented herein.

1.3. Client Device Configuration

Figure 3:
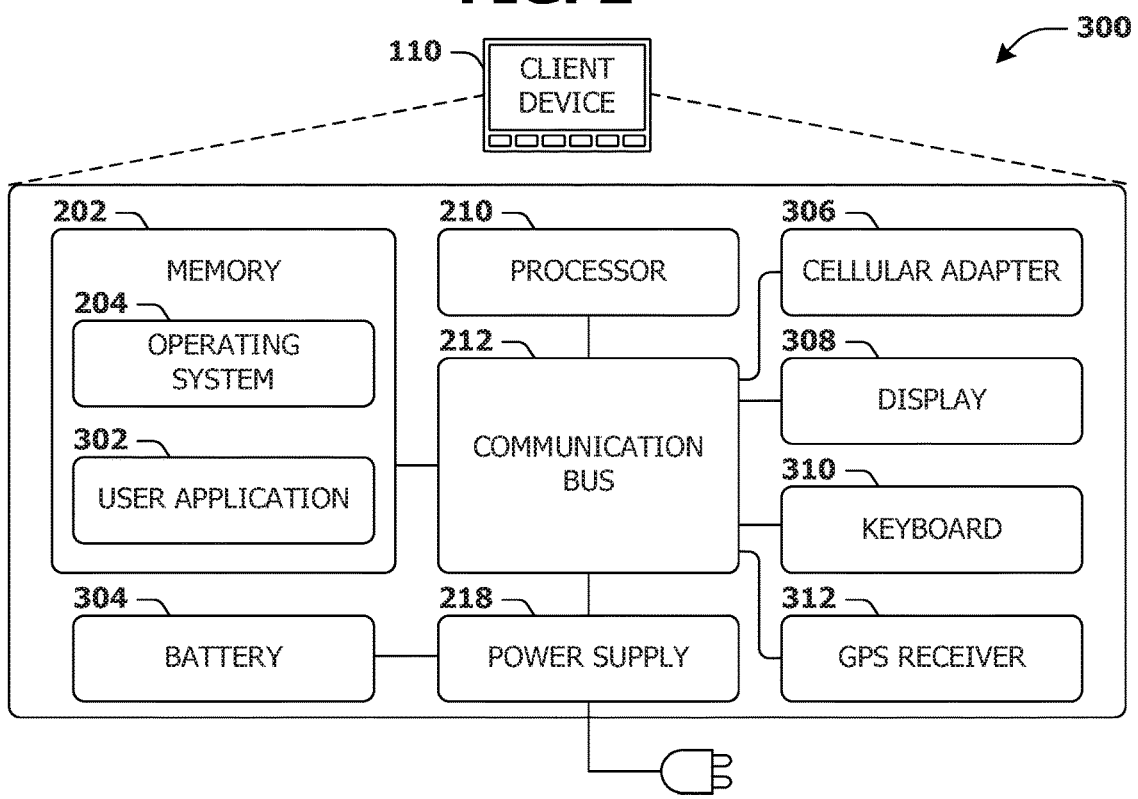
FIG. 3 is an illustration of a scenario involving an example configuration of a client that may utilize at least a portion of the techniques presented herein.

FIG. 3 presents a schematic architecture diagram 300 of a client device 110 operable by a user 112, whereupon at least a portion of the techniques presented herein may be implemented. Such client devices 110 may vary widely in configuration or capabilities, in order to provide a variety of functionality to the user 112. A client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and a component of a piece of furniture, such as a tabletop, and/or of another device, such as a vehicle or residence. A client device 110 may also serve the user 112 in a variety of roles, such as a workstation, kiosk, media player, gaming device, and/or appliance.

A client device 110 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. A client device 110 may also comprise a memory 202 storing various forms of applications, such as an operating system 204; one or more user applications 302, such as document applications, media applications, file and data access applications, communication applications such as web browsers and email clients, utilities, and games; and drivers for various peripherals. A client device 110 may also comprise a variety of peripheral components, such as a wired and/or wireless network adapter 214 connectable to a local area network 106 and/or wide area network 108; one or more output components, such as a display 308 coupled with a display adapter (optionally including a graphical processing unit (GPU)), a sound adapter coupled with a speaker, and a printer; input devices for receiving input from the user 112, such as a keyboard 310, a mouse, a microphone, a camera, and/or a touch-sensitive component of the display 308; and/or environmental sensors, such as a global positioning system (GPS) receiver 312 that detects the location, velocity, and/or acceleration of the client device 110, and/or an compass, accelerometer, and/or gyroscope that detects a physical orientation of the client device 110. Other components that may optionally be included with the client device 110 (though not shown in the schematic diagram 300 of FIG. 3) include one or more storage components 216, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

A client device 110 may comprise a mainboard featuring one or more communication buses 212 that interconnect the processor 210, the memory 202, and various peripherals, using a variety of bus technologies, such as a variant of a serial or parallel AT Attachment (ATA) bus protocol; the Uniform Serial Bus (USB) protocol; and the Small Computer System Interface (SCI) bus protocol. A client device 110 may also comprise a dedicated and/or shared power supply 218 that supplies and regulates power for the other components, and/or a battery 304 that stores power for use while the client device 110 is not connected to a power source via the power supply 218. The client device 110 may also provide power to and/or receive power from other client devices 110.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user 112 via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may also include one or more servers that may locally serve the client device 110 and/or other client devices 110 of the user 112 and other individuals. For example, a locally installed webserver may provide web content in response to locally submitted web requests. Many such client devices 110 may be configured and/or adapted to utilize at least a portion of the techniques presented herein.

1.4. Content Item Presentation

Figure 4:
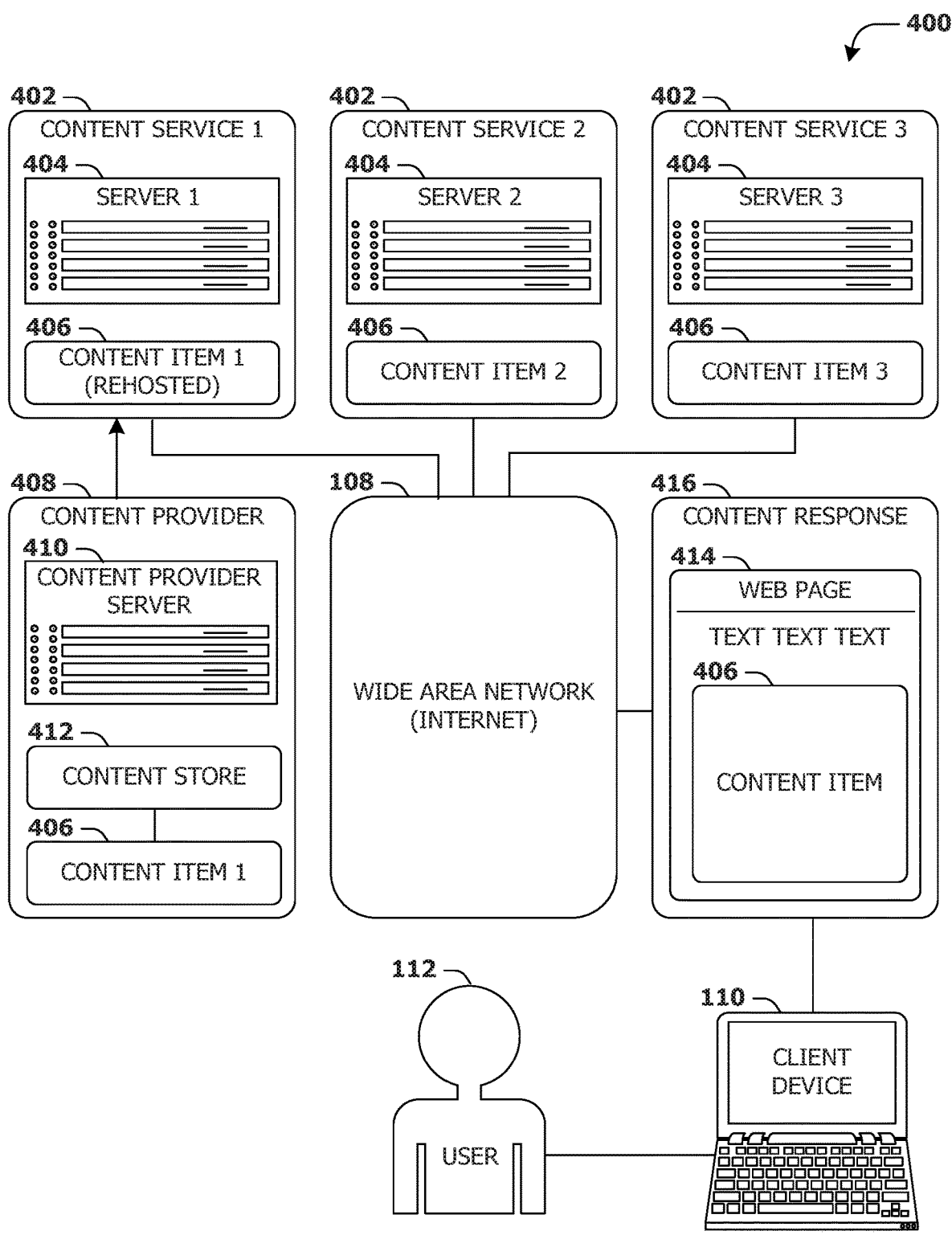
FIG. 4 is an illustration of a scenario involving a presentation of content items stored by a set of content services and transmitted to a client device for presentation to a user.

FIG. 4 is an interaction diagram of a scenario 400 featuring the delivery of content items to a client device for presentation to a user. In this scenario 400 of FIG. 4, a set of content services 402 respectively comprise a server 404 that provides access to a set of content items 406, such as text articles, pictures, video, audio, applications, data files, and output from devices such as cameras. A content provider 408 is provided, comprising a content provider server 410 that interacts with the content services 402 over a wide area network 108, such as the Internet, to index the content items 406 provided thereby. For example, the content provider server 410 may utilize a content crawler that iteratively explores the content services 402 and generates a content store 412, e.g., a collection of the content items 406 or references thereto, and/or a content index that enables rapid identification of particular content items 406. The content provider 408 may be deployed in a distributed manner across at least two content provider servers 410, which may be organized by role (e.g., a first content provider server 410 hosting a content item 406, and a second content provider server 410 interacting with users 112 and/or client devices 110) and/or geographically (e.g., various content provider servers 410 may be provided to service client devices 110 in different physical locations). In some cases, a first content provider server 410 may rehost a content item 406 that originates from and/or serves as an original source of the content item 406. Components may be duplicated within the content provider 408; e.g., two or more content provider servers 410 may be provided to facilitate the reliability, response time, and/or scalability of the content provider 408.

As further illustrated in the scenario 400 of FIG. 4, a user 112 of a client device 110 may engage in an interaction with the content provider 408 and/or content services 402 in the following manner. For example, the client device 110 may present a request for a web page 414 provided by the content provider 408, such as a web page identified by a uniform resource location (URL). In response, the content provider 408 may transmit a content response 416 that includes a web page 414 comprising various sets of content, including a content item 406 to which an annotation 418 of information has been attached. The content item 406 may be selected by the content provider 408 from the content store 412, which may attach the annotation 418 based on a collection of information from public sources; e.g., if the content item 406 comprises a description of an event, the annotation 418 may comprise a map depicting the location of the event. In this manner, the client device 110 retrieves content items 406 in response to the request by the user 112, and thereby achieves the presentation of the content item 406 along with an annotation 418 of supplemental information as provided by the content provider 408.

1.5. Usage Policy Enforcement

Figure 5:
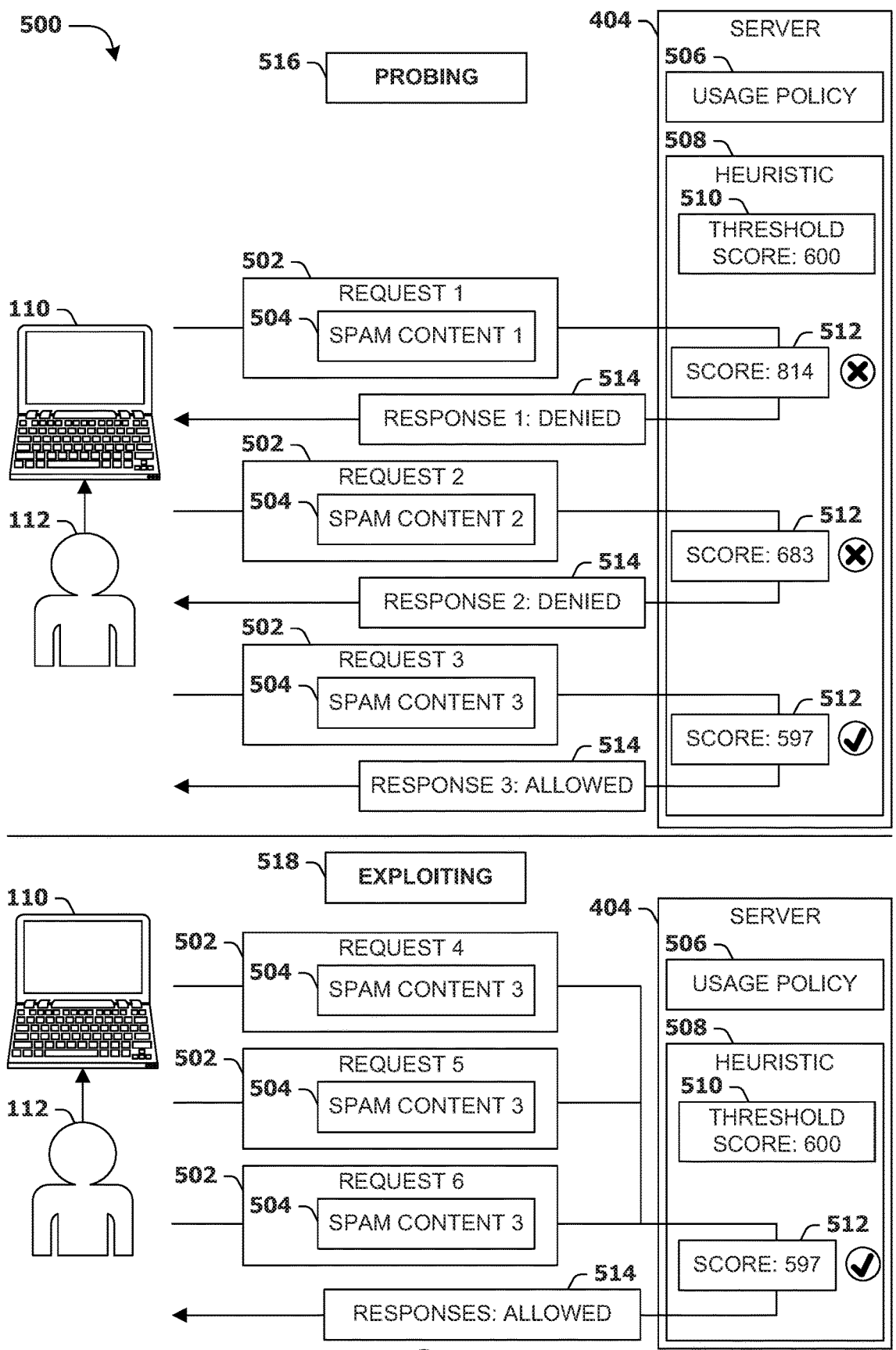
FIG. 5 is an illustration of a scenario involving an evaluation of requests to utilize a service.

FIG. 5 is an illustration of an example scenario 500 featuring a server 404 that provides a service by a user 112. In this example scenario 500, the server 404 may comprise, e.g., an email server that delivers mail; a media server that delivers streaming media; and/or a file server that provides files such as documents and application binaries.

The server 404 may utilize the usage policy 506 to preserve the resources of the server 404. As a first such example, the server 404 may require that users 112 personally access the service, rather than utilizing unattended processes that execute on a client device 110 to access the server 404 without the direct control of the user 112, such as "bots" that automatically traverse the content of a webserver to request and retrieve all content. Because automated access may overutilize the resources of the server 404 in a manner that prevents the server 404 from servicing the requests of other users 112 and/or inflates the infrastructure costs of the server 404 such as bandwidth, the usage policy 506 may prohibit unattended access. As a second such example, the server 404 may provide an email transmission service that prohibits users 112 from sending spam (bulk unsolicited messages), such as spam, which may overutilize the resources of the server 404 while also irritating a large number of recipients. As a third such example, the server 404 may restrict access to protected resources to only certain of users 112, such as private files or databases, and may enforce such restriction through the use of usernames and passwords. The usage policy 506 may prohibit users 112 from engaging in brute-force guessing of other users' passwords in order to gain unauthorized access to such other users' private resources.

In order to enforce the usage policy 506, the server 404 may receive requests 502 from users 112, and may evaluate individual requests with a heuristic 508 to determine whether or not the request 502 complies with the usage policy 506. As a first example, the heuristic 508 may endeavor to verify that the user 112 is a human and not an automated process, such as by presenting a "captcha" verification test. As a second example, before delivering an email message that a user 112 has requested to send, the heuristic 508 may evaluate the content of the message (e.g., the recipients, the body, and the targets of links embedded in the message) to determine whether the message resembles recognizable examples of bulk unsolicited email. As a third example, before testing a user's submitted credentials in a request 502 to access a protected resource, the server 404 may endeavor to determine whether the request 502 is part of a pattern of brute-force guessing.

Using such heuristics 508, the server 404 may endeavor to enforce the usage policy 506. In particular, the heuristic 508 may generate a score 512 that indicates the likelihood that a request 502 violates the usage policy 506, wherein a high score (such as 1,000) indicates a high-confidence conclusion that the request 502 violates the usage policy 506 and a low score (such as 10) indicates a high-confidence conclusion that the request 502 does not violate the usage policy 506. The scores 512 may represent a confidence spectrum or continuum between these high-confidence determinations, wherein intermediate scores 512 represent indefinite conclusions as to whether a particular request 502 violates the usage policy 506. The server 404 may also compare the scores 512 of the individual requests 502 with a score threshold 510, such as an arbitrarily selected point in the continuum below which the request 502 is determined to comply with the usage policy 506, and above which the request 502 is determined to violate the usage policy 506. In response to this determination, the server 404 may utilize a variety of techniques; e.g., requests 502 that are scored below the score threshold 510 may be fulfilled, while requests 502 that are scored above the score threshold 510 may be denied. By comparing the scores 512 of the individual requests 502 generated by the heuristic 508 with the score threshold 510, the server 404 may enforce the usage policy 506 over users' requests 502.

However, as further shown in the example scenario 500 of FIG. 5, some users 112 may endeavor to evade the protective measures of the server 404 in order to utilize the service in a manner that violates the usage policy 506. Such users 112 may do so by identifying a type of requests 502 that the heuristic 508 permits, and then utilizing this type of request 502 as a template for further requests 502 that, in the aggregate, violate the usage policy 506. For example, a user 112 may first engage in probing 516 of the server 404 by providing a series of requests 502, such as email messages with spam content 504. A first such request 502 may be correctly identified by the heuristic 508 as presenting a strong likelihood of being spam, resulting in a high score 512 that fails the score threshold 510. Accordingly, the server 404 may provide a response 514 that denies the transmission of the message. Upon receiving the response 514, the user 112 may adjust the spam content 504 of the message to appear marginally less like spam (e.g., toning down marketing language, or adding additional content that superficially appears to be non-marketing language), and may submit the adjusted spam content 504 in a second request 502. The heuristic 508 may evaluate this second request 502 to produce a score 512 that is lower, but still above the score threshold 510, and may transmit a second response 514 that denies the message. A third attempt by the user 112 may produce a message with spam content 504 that is still further adapted, and may submit a third request 502 for which the heuristic 508 produces a score 512 that is barely under the score threshold 510. Accordingly, the server 404 provides a response 514 indicating that the message was accepted and transmitted. The server 404 therefore produces a false negative response 514 by incorrectly determining that the third request 502 is within the usage policy 506.

Having identified a particular set of span content 504 that is incorrectly evaluated to comply with the usage policy 506, the user 112 may engage in an exploit 518 of the server 404 by initiating a large number of requests 502, each presenting the same spam content 504. The server 404 may identify a score 512 for each such message that is barely under the score threshold 510, and therefore may provide responses 514 indicating that all such messages were successfully transmitted. The user 112 may therefore succeed in exploiting the server 404 in a manner that evades the server 404 by circumventing the enforcement mechanisms of the heuristic 508.

In order to reduce the incidence of such exploits 518, a server 404 may be configured to respond to violations of the usage policy 506 in a more assertive manner. For example, the server 404 may apply a penalty to users 112 who submit requests 502 that result in a high score 512 above the score threshold 510, such as temporarily or permanently blacklisting users 112 such that any further requests are categorically rejected even without evaluation. However, such penalties may result in false positives, in which a user 112 engaging in legitimate behavior initiates a request 502 that is incidentally evaluated with a high score 512 that fails the score threshold 510, and is therefore incorrectly penalized. As a first example, a user 112 who receives an email message that looks like a phishing attempt may forward the message to an administrator, e.g., to inquire about its legitimacy and/or to inform the administrator of the phishing attempt. However, the heuristic 508 may produce a high score 512 due to the phishing content, and the server 404 may inadvertently characterize the user 112 as initiating a phishing attempt on the administrator. As a second example, a user 112 who utilizes many user accounts may not remember the password of a particular account. When the user's password attempts fail a score threshold (e.g., more than three incorrect guesses in a minute), the heuristic 508 may indefinitely block the account until the block is listed by an administrator. In such scenarios, the server 404 may automatically apply responsive penalties, such as blocking attempts and/or banning the user 112. Such application may apply an overly assertive penalty to this activity—even if the user has a lengthy history of legitimate activity; even if the suspicious activity barely violates the score threshold 510 (e.g., the score threshold 510 may be established as identifying malicious requests as those yielding a score above 600, and the user's particular request 502 may produce a score of 601).

It may be appreciated that both limitations arise due to the naivete of the heuristic 508 in evaluating the scores 512 of individual requests 502 against a static threshold 510 to distinguish between legitimate activity and misuse, largely irrespective of other requests 502 by the same user 112 that occurred previously and/or subsequently to the individual request. In the case of false negatives, the server 404 reaches an incorrect determination of the third request 502 by establishing an individual score 512 for the request 502 irrespective of the previous scores 512 for previous requests 502. In the case of false positives, the server 404 reaches an incorrect determination that a user's activity violates the usage policy 506 irrespective of a lengthy history of past legitimate activity by the user 112, as well as the automatic application of a penalty that blocks the user's future requests 502 that would otherwise have yielded very low scores 512 that accurately reflect legitimate use. These incorrect decisions reflect the relative fragility of protective mechanisms that enforce a usage policy 506 based on scoring and heuristics 508 in the manner depicted in the example scenario 500 of FIG. 5.

2. Presented Techniques

Figure 6:
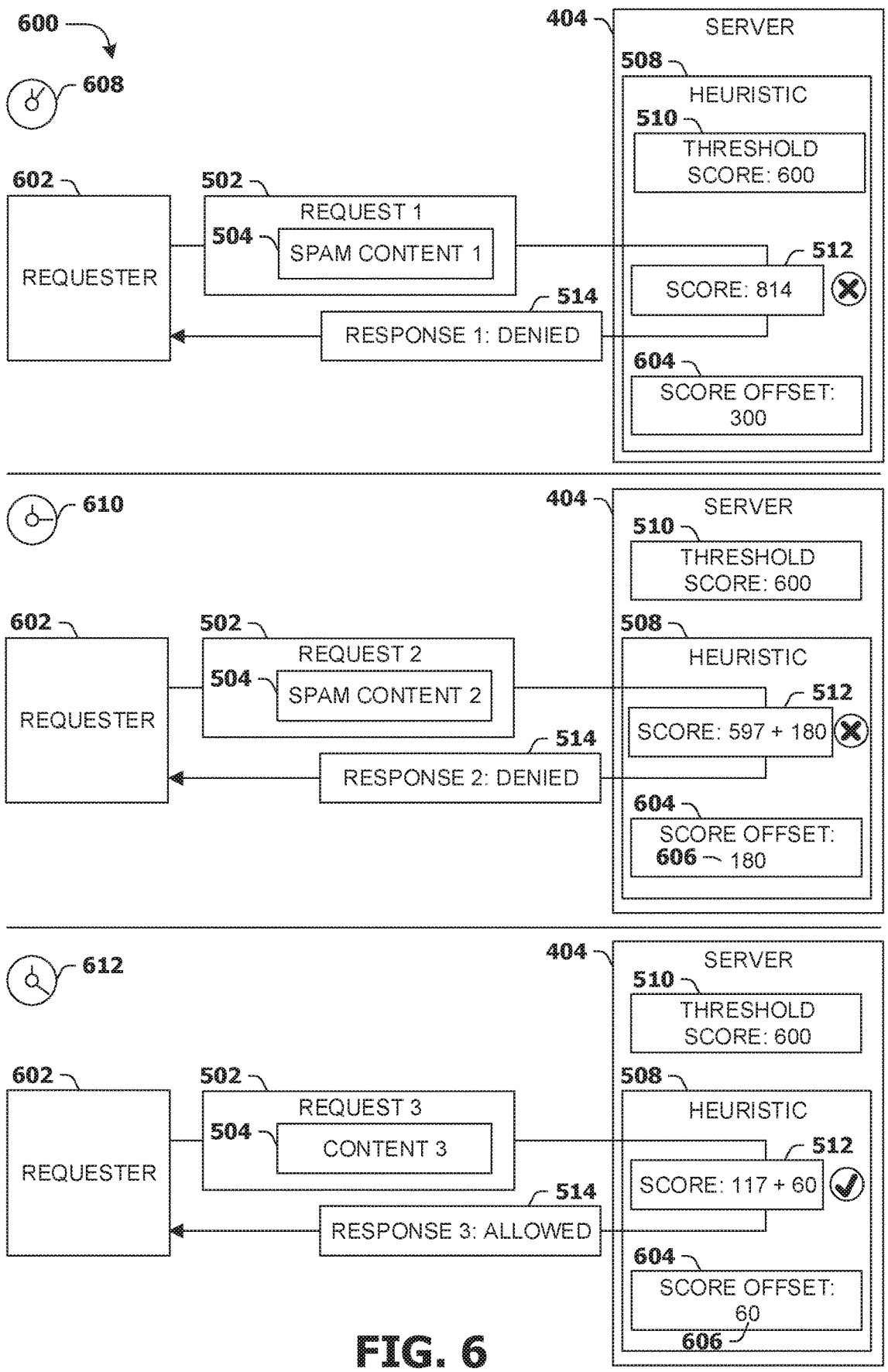
FIG. 6 is an illustration of a scenario involving an evaluation of requests to utilize a service in accordance with the techniques presented herein.

FIG. 6 is an illustration of an example scenario 600 involving alternative techniques for evaluating requests 502 to utilize a service in accordance with the techniques presented herein.

In this example scenario 600, at a first time 608, a requester 602 performs a probing 516 of a server 404 by initiating a first request 502 that violates a usage policy 506 of a server 404, such as spam content 504 that is recognized as such by a heuristic 508. The heuristic 508 produces a high score 512 that exceeds a score threshold 510, and the server 404 presents a response 514 that denies the request 502 to send the message. Additionally, the server 404 initiates a score offset 604 that is applicable to the scores 512 of future requests 502 send by the requester 602. The score offset 604 also decays 606 over time (e.g., by 5% per minute). At a second time 610, the requester 602 submits a second request 502 containing marginally adapted spam content 504, for which the heuristic 508 produces a lower score 512. The lower score 512 might by itself fall below the score threshold 510, but the server 404 adds the score offset 604, decayed 606 according to the time difference between the first time 608 and the second time 610, to the score 512 produced by the heuristic 508. The adjusted score now exceeds the score threshold 510, causing the server 404 to present a second response 514 that the second request 502 was also denied. The application of the score offset 604 for comparison of the score 512 generated by the heuristic 508 with the score threshold 510, as a reflection of the past activity by the requester 602, enables the server 404 to adapt to the pattern of requests 502.

Conversely, the server 404 in the example scenario 600 of FIG. 6 may also reduce the incidence of false positives. For example, a legitimate requester 602 may have been incorrectly endeavoring to violate the usage policy 506 of the server 404. Rather than applying a "hard block," such as banning the requester 602, the server 404 may apply a score offset 604 that results in a denial of requests 502 that appear ambiguous, but that also permits requests 502 by the same requester 602 that exhibit a high likelihood of legitimate activity that complies with the usage policy 506. For example, at a third time, the same requester 602 may submit a third request 502 that results in a low score 512 from the heuristic 508. Even if the score 512 is adjusted by the score offset 604 for comparison with the score threshold 510, the adjusted score may still satisfy the score threshold 510, and may therefore be allowed by the server 404. In this manner, the "soft block" nature of the score offset 604 may permit the requester 602 to complete clearly legitimate requests 502 to use the server 404 even if past requests 502 appeared to violate the usage policy 506. In this manner, the server 404 evaluates requests 502 to utilize the service in view of the usage policy 506 in accordance with the techniques presented herein.

3. Technical Effect

The techniques presented herein and illustrated in the scenario 600 of FIG. 6 may provide a variety of technical effects for evaluating requests to utilize a service in view of a usage policy 506.

As a first such example of a potentially achievable technical effect, the adjustment of scores 512 by score offsets 604 may enable servers 404 to respond correctly to attempts to evade a usage policy 506, such as probing 516 by users 112 in an attempt to identify requests 502 that are incorrectly allowed, upon which a high volume of future requests 502 may be patterned. The initiation and usage of a score offset 604 implements a persistence of determinations that past requests 502 by a requester 602 violated the score threshold 510, which may adjust determinations that ambiguous requests 502 that are just below the score threshold 510, and might otherwise be allowed, are more likely to reflect a violation of the usage policy 506 and are to be denied. Moreover, the decaying 606 nature of the score offset 604 may at least partially obfuscate to the requester 602 the particular point at which the score threshold 510 has been set; i.e., the requester 602 may be unable to determine whether the relative degree to which a particular request 520 was denied due to its content 504 and in view of past requests 502.

As a second such example of a potentially achievable technical effect, the application of score offsets 604 to scores 512 generated by heuristics 508 may mitigate the effects of false positives. For example, legitimate users 112 who submit requests 502 that are inadvertently scored above a score threshold 510 may be automatically banned by a server 404, which may frustrate the user 112 and inefficiently consume user attention and effort to resolve, such as a manual review of the request 502 and a release of the ban by an administrator. Instead, the initiation of a score offset 604, to be applied to future requests 502 by the requester 602, may permit the requester 602 to continue engaging in legitimate requests 502, such as sending mail that exhibits a high confidence of complying with the usage policy 506 (e.g., no likelihood of comprising spam)—which, even if adjusted by a score offset 604, are still within the score threshold 510. The "soft block" nature of the score offset 604 may therefore serve to disambiguate and potentially block borderline requests by the requester 602 while permitting legitimate uses of the service.

As a third such example of a potentially achievable technical effect, the decaying 606 nature of the score offset 604 may significantly delay the probing 516 of the requester 602. That is, the requester 602 may receive different responses 514 when submitting requests 502 in different sequences, and it may be difficult for the requester 602 to predict how the server 404 is likely to respond to any particular content 504 without initiating a large number of such sequences of requests 502 over an extended period of time. Such difficulty may cause some requesters 602 to abandon the attempt to exploit the server 404 out of frustration. The decaying 606 may also delay the successful exploiting 518 of the server 404 by more persistent users 112, which may provide sufficient time for an administrator to notice and respond to the probing 516 and/or exploiting 518 (e.g., the extended period of time required to complete the probing 516 may be sufficient for an administrator to evaluate the pattern of requests 502 and to implement a blacklist of the user 112). Conversely, requesters 602 whose individual requests 502 are determined to fail the score threshold 510 may incur only temporarily heightened suspicion, such that refraining from borderline requests 502 over a period of time may produce a restoration of trust in the requester 602. In this manner, the configuration of the server 404 in accordance with the techniques presented herein (such as shown in the example scenario 600 of FIG. 6) enables the server 404 to apply the usage policy 506 in a more consistent manner.

4. Example Embodiments

Figure 7:
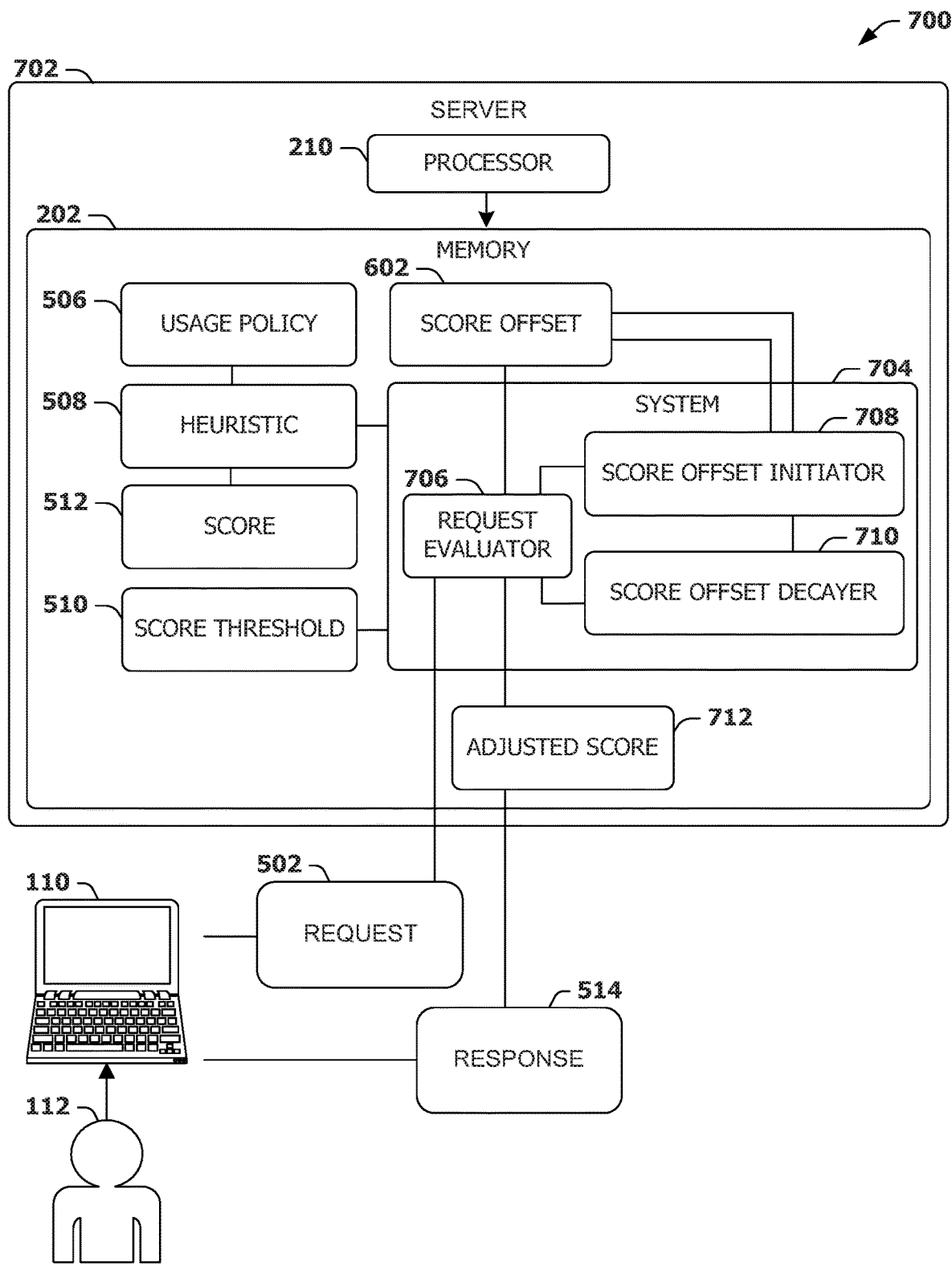
FIG. 7 is an illustration of a scenario featuring an example server that evaluates requests to utilize a service in accordance with the techniques presented herein.

FIG. 7 presents an illustration of a scenario 700 involving some example embodiments of the techniques presented herein. In this example scenario 700, an example server 702 provides a service to a user 112 of a client device 110, such as email service, web service, media service, and/or file-sharing service, which is accessed through the submission of requests 502 that produce responses 514. The example server 702 comprises a processor 210 and a memory 202 that stores instructions executed by the processor 210. The memory 202 includes a heuristic 508 that reflects a usage policy 506 and that generates scores 512 for requests 502 that indicates the likelihood of compliance with the usage policy 506, and a score threshold 510 against which the scores 512 are compared to determine whether to allow or deny the request 502. The memory 202 also comprises the components of an example system 704 that embodies the techniques presented herein. For example, the example system 704 comprises a request evaluator 706 that determines scores 512 for respective requests 502 indicating whether the requests 502 comply with the usage policy 506, and that determines whether or not to fulfill such requests 502 based upon a comparison with the score threshold 510. The example system 704 also comprise a score offset initiator 708 that initiates a score offset 604, and a score offset decayer 710 that decays the score offset 604 over time.

Using such a system 704, the example server 702 operates in the following manner. For a first request 502, the request evaluator 706 invokes the heuristic 508 to determine a first score 512 indicating whether the first request 502 complies with the usage policy 506 of the service, and determines whether to fulfill the first request 502 by comparing the first score 512 with the score threshold 510, providing a suitable response 514 indicating a fulfillment or denial of the request 502. Responsive to the first score 512 failing the score threshold 510, the score offset initiator 708 initiates the score offset 604, and the score offset decayer 710 decays the score offset 604 over time. Accordingly, for a second request 502 by the user 112, the request evaluator 706 determines a second score 512, and determines whether to fulfill the second request 502 by comparing the second score 512 adjusted by the score offset 604 to the score threshold 510. The comparison of the adjusted score 712 to the score threshold 510 enables the example server 702 to evaluate and respond to the second request 502 in a manner that reflects and persists the earlier evaluation of the first request 502, in accordance with the techniques presented herein. In such a manner, the techniques presented herein may be embodied as a system such as the example system 704 in the example scenario 700 of FIG. 7, and/or as a device such as the server 702 in the example scenario 700 of FIG. 7.

Figure 8:
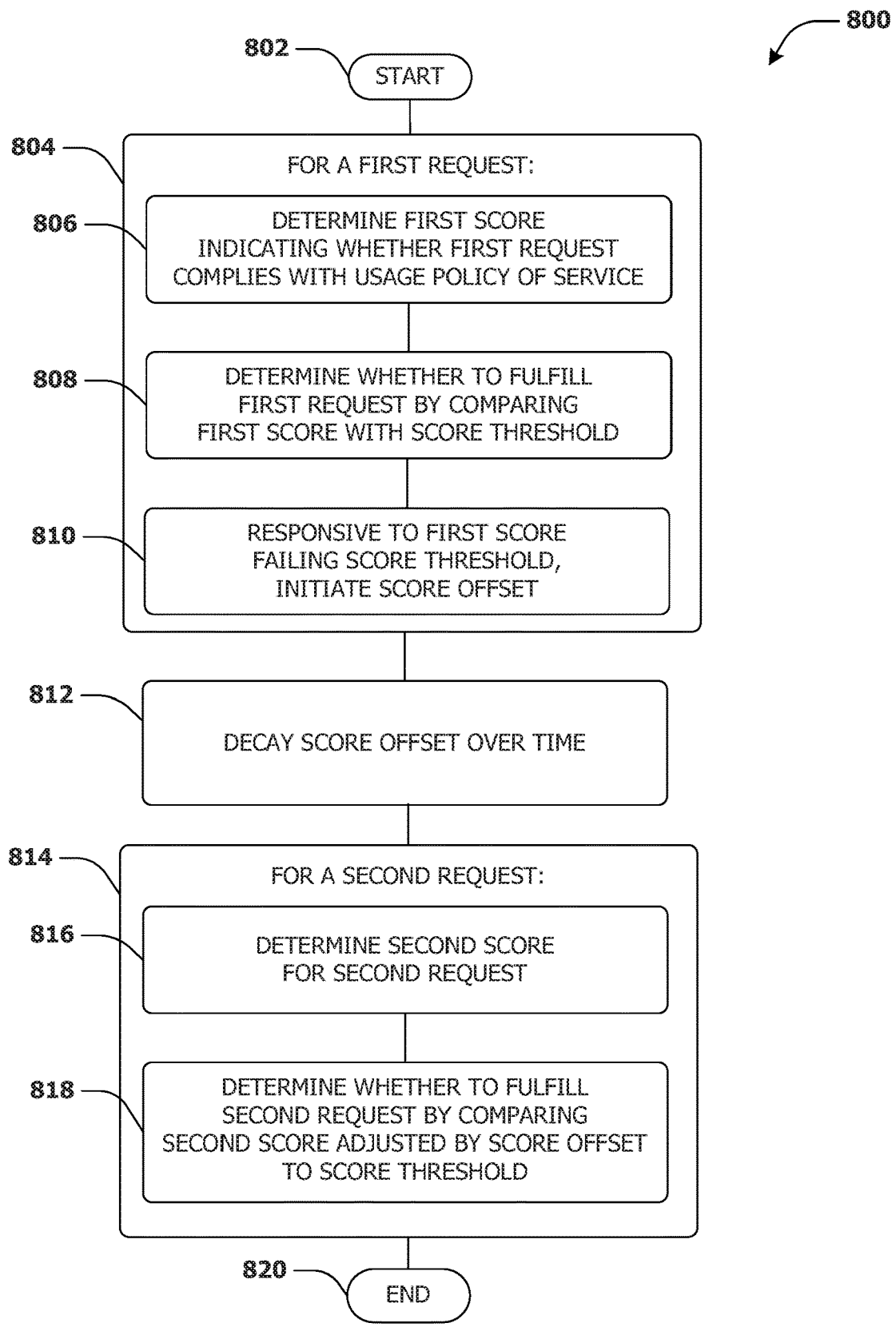
FIG. 8 is an illustration of a scenario featuring an example method of evaluating requests to utilize a service in accordance with the techniques presented herein.

FIG. 8 presents an illustration of another example embodiment of the techniques presented herein, illustrated as an example method 800 of evaluating requests to utilize a service. The example method 800 may be implemented, e.g., as instructions stored in a memory (e.g., a hard disk drive, a solid-state storage device such as a flash memory device, or a magnetic or optical disc) that, when executed on a processor of a server 404, cause the server 404 to operate according to at least a portion of the techniques presented herein.

The example method 800 begins at 802 and involves evaluating 804 a first request 502 in the following manner. The example method 800 involves determining 806 a first score 512 indicating whether the first request 502 complies with a usage policy 506 of the service, and determining 808 whether to fulfill the first request 502 by comparing the first score 512 with a score threshold 510. The example method 800 also involves, responsive to the first score 512 failing the score threshold 510, initiating 810 a score offset 604. The example method 800 also involves decaying 812 the score offset 604 over time. The example method 800 also involves evaluating 814 a second request 502 by determining 816 a second score 512 for the second request 502, and determining 818 whether to fulfill the second request 502 by comparing the second score 512 adjusted by the score offset 604 to the score threshold 510. Having achieved the evaluation of the requests 502 of the user 112 in accordance with the techniques presented herein, the example method 800 ends at 820.

Figure 9:
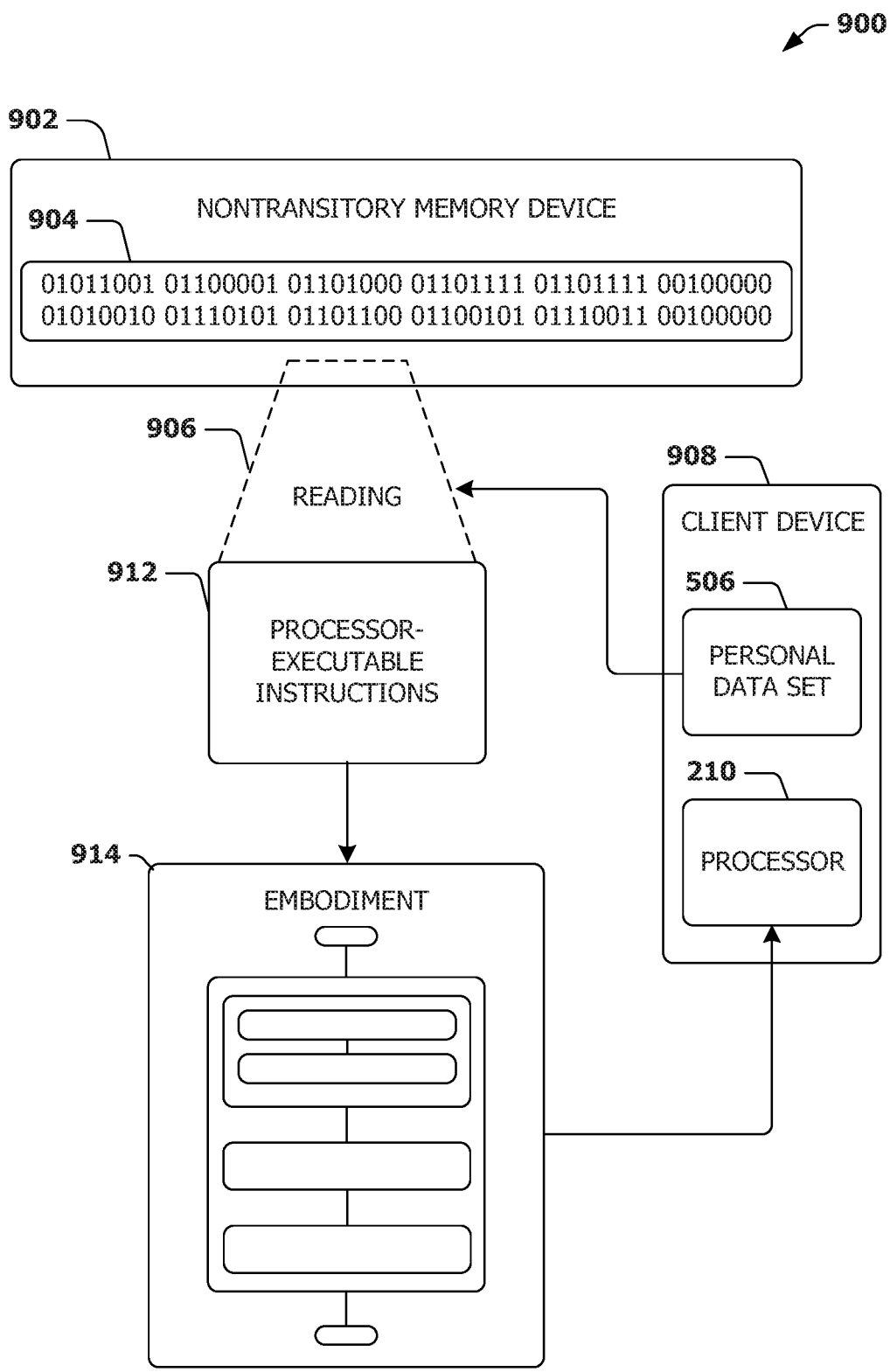
FIG. 9 is an illustration of a scenario featuring an example nontransitory memory device that causes a device to evaluate requests to utilize a service in accordance with the techniques presented herein.

FIG. 9 is an illustration of a scenario 900 involving a third example embodiment of the techniques presented herein, comprising an example nontransitory memory device 902, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 902 stores computer-readable data 904 that, when subjected to reading 906 by a reader 910 of a device 908 (e.g., a read head of a hard disk drive, or a read operation invoked on a solid-state storage device), express processor-executable instructions 912. The processor-executable instructions 912, when executed on a processor 210 of the device 908, cause the device 908 to evaluate requests 502 to utilize a service, in accordance with the techniques presented herein. In another example, the computer-executable instructions may implement one or more components of a system, such as the first example server 702 of FIG. 7, the example system 704 of FIG. 7, and the example method 800 of FIG. 8, such that when the instructions are executed on a processor of a client device 110 and/or server 404, implement the systems that cause such devices to operate in accordance with the techniques presented herein.

5. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example devices and systems of FIG. 7; the example method 800 of FIG. 8; and the example nontransitory memory device 902 of FIG. 9) to confer individual and/or synergistic advantages upon such embodiments.

5.1. Scenarios

A first aspect that may vary among embodiments of the presented techniques involves the scenarios in which such techniques may be utilized.

As a first such example, the techniques presented herein may be utilized with a variety of services, such as an email service that transmits and/or receives email messages for users 112; a file service that receives, transmits, stores, modifies, indexes, and/or provides access to files such as documents and databases; a media service that provides downloadable and/or streaming access to media; and a login service that examines credentials to authenticate users 112 who seek access to protected resources. Such services may be provided by a server device, a client device, and/or or a collection of interoperating devices, such as a geographically distributed server farm.

As a second such example, the services and techniques presented herein may be implemented through various architectures. For example, the service, the usage policy 506, the heuristic 508, and a score offset system (such as the example system 704 of FIG. 7) may be implemented on a single server device, such as the example server 104 of FIG. 2, and/or a single client device, such as the example client device 110 of FIG. 3. The use of such techniques on a client device may be useful, e.g., for detecting attempts to probe system resources over which access is restricted, such as operating system libraries that are not to be altered; attempts by a user 112 who is probing 516 such resources for vulnerabilities may be detected and denied through the adaptive techniques presented herein. Other architectural variations involve a collection of interoperating devices that distribute the functionality of the service (e.g., an email server may store and transmit messages, while an email client presents the messages in a particular mailbox to a user 112), and the techniques presented herein may also be distributed (e.g., a first server may apply a heuristic 508 to generate scores 512 for requests 502, and a second server may utilize the scores 512 to determine whether to fulfill or deny a request 502, and/or to transmit a response 514 to the request 502).

As a third such example, the techniques presented herein may be utilized with a variety of usage policies 506 and/or heuristics 508 used to identify scores 512 that indicate the confidence that a particular request 502 complies with or violates the usage policy 506. As a first example, the usage policy 506 may prohibit automated access to the service, and the heuristic 508 may comprise a captcha mechanism that evaluates a requester's evaluation of an image, text, puzzle, etc. to determine whether the requester 602 is human or an automated process. As a second example, the usage policy 506 for an email service may prohibit the transmission of bulk unsolicited messages, and the heuristic 508 may evaluate messages to determine the likelihood that the content 504 is a bulk unsolicited message, e.g., by evaluating keywords in the body of the message; by comparing the substance of the message to examples bulk unsolicited messages; and/or by considering sender trust levels (e.g., whether the user 112 is requesting to send messages to a large number of email addresses that have not previously communicated with the user 112). As a third example, the usage policy 506 may prohibit users 112 from submitting credentials for other users 112 in order to attain unauthorized access to private resources, and the heuristic 508 may comprise an evaluation of submitted credentials (e.g., a series of login attempts) to determine whether or not the requester 602 is attempting by brute-force to guess the credentials of another user 112. As a fourth example, the usage policy 506 may prohibit wasteful activities that lead to a deliberate exhaustion of resources of a service, such as flooding a server process with inauthentic requests and/or filling a storage volume with meaningless data in order to constrain the capacity of the service to fulfill similar but legitimate requests from other users 112, and the heuristic 508 may examine requests 502 in order to determine legitimate vs. illegitimate requests (e.g., for a webserver fulfilling web page requests, determining whether a particular user 112 submitting a URL actually wishes to view the web page or merely wishes to compel the server to expend computing resources providing the contents of a web page that are discarded without review).

As a fourth such example, the heuristics 508 may also produce a variety of scores 512 in response to the requests 502. For example, the scores 512 may be numeric and/or symbolic, and may provide a range wherein low scores 512 indicate a high confidence of complying with the usage policy 506 and high scores 512 indicate a high confidence of violating the usage policy 506 (such that failing the score threshold 510 occurs when scores 512 are above the score threshold 510), or vice versa (such that failing the score threshold 510 occurs when scores 512 are below the score threshold 510). The heuristic 508 may also report the score 512 as a binary decision of whether or not to allow the request 502; as an absolute value; or a relative value (e.g., a percentage by which a score 512 is above or below the score threshold 510). Additionally, the scores 512 produced by the heuristic 508 may also be limited to only one such conclusion (e.g., where high scores 512 connote a high confidence of violating the usage policy 506, but low scores 512 represent no conclusion about compliance with nor violation of the usage policy 506), and/or may report multiple scores 512 along various dimensions of the usage policy 506 (e.g., a first score 512 indicating whether or not the usage policy 506 is violated and a second score 512 indicating the confidence or accuracy likelihood of the first score 512; a first score 512 indicating whether the request 502 violates a first aspect of the usage policy 506 and a second score 512 indicating whether the request 502 violates a second aspect of the usage policy 506); and/or a first score 512 for a request 502 determined by a first heuristic 508 according to a first analytic technique and a second score 512 for the same request 502 determined by a second heuristic 508 according to a second, different analytic technique. These and other scenarios may provide a suitable basis for utilizing the techniques presented herein.

5.2. Using Scores and Initiating Score Offset

A second aspect that may vary among embodiments of the presented techniques involves the evaluation of a first request 502 through comparison of a score 612 with a score threshold 510, and the initiation of a score offset 604 for requests 502 that fail the score threshold 510.

As a first such example, a server 404 may apply a variety of actions to requests 502 that fail the score threshold 510, such as denying the request 502; disregarding the request 502; blocking the request 502; temporarily or permanently blocking a user account used by a requester 602; substituting different content for requested content; or throttling the performance of the request 502, such as providing requested media at a lower bitrate. The server 404 may also log the request 502 and/or the identity of the requester 602; notify an administrator of the service regarding the request 502; apply a second level of scrutiny to the request 502, such as more intensive analysis; and/or forward the request 502 to an administrator for further review to determine whether or not to fulfill the request 502. The server 404 may also utilize the request 502 to train adaptive techniques to recognize requests 502 that violate the usage policy 506, which may enable the server 404 to adapt automatically to recognize and block such requests 502 in the future. In some embodiments, the server 404 may take different responsive actions based upon the score 512 indicating the confidence that the request 502 violates the usage policy 506—e.g., choosing a failure response 514 for the request 502 according to a score difference between the score 512 of the request 502 and the score threshold 510. For example, for requests 502 that are scored with high confidence of violating the usage policy 506, the user account of the requester 602 may be blocked; but for requests 502 that are ambiguous, the server 404 may merely deny the request 502. Such gradation may reduce the incidence and frustration incurred by false positives.

As a second such example, for requests 502 that result in a score 512 that fails a score threshold 510, a server 404 may initiate a score offset 604 in a number of ways. As a first example, the server 404 may initiate a decay rate for decaying the score offset 604, and/or may utilize a predefined or fixed decay rate for decaying the score offset 604. As a second example, the score offset 604 may be established as a predefined value for any request 502 that fails the score threshold 510, irrespective of the magnitude of the failure. Alternatively, the server 404 may initiate the score offset 601 proportionally with a difference between the score 512 and the score threshold 510. For example, scores 512 that only barely fail the score threshold 510 may result in a relatively small score offset 604 and/or a relatively rapid decay rate, while scores 512 that fail the score threshold 510 by a wide margin may result in a relatively large score offset 604 and/or a relatively slow decay rate. As a third such example, the server 404 may select the score offset 604, optionally including the decay rate, based upon the nature of the request 502; e.g., requests 502 that represent relatively minor infractions of the usage policy 506 (such as a small volume of spam) may result in a relatively small score offset 604 and/or a relatively rapid decay rate, while requests 502 that exhibit potentially dangerous violations of the usage policy 506 (such as a large volume of spam, damage to the server 404, or attempts to attain unauthorized access to sensitive data) may result in a relatively large score offset 604 and/or a relatively slow decay rate.

As a third such example, the server 404 may initiate the score offset 604, optionally including the decay rate, with a degree of randomization. For example, materially identical requests 502 that exhibit the same violation of the usage policy 506 may result in modestly different score offsets 604 and/or decay rates. Such randomization may be desirable, e.g., for further obscuring the protective mechanisms, thereby frustrating users 112 who engage in probing 516 with the intent of exploiting 518 the server 404.

As a fourth such example, the server 404 may generate many kinds of responses 514 to a request 502 that fails the score threshold 510. For example, the server 404 may notify the user 112 of the denial of the request 502; may falsely suggest that the request 502 was fulfilled (e.g., notifying the user 112 that spam messages were sent, and instead silently disregarding the messages); may present a noncommittal message (e.g., indicating only that a submitted message will be delivered if it is found to comply with the usage policy 506); may refrain from presenting any response 514; and/or may indefinitely delay the response 514 (e.g., receiving and promptly discarding the request 502, but pretending to process the request 502 for an extended period of time, thus causing the user 112 and/or client device 110 to wait indefinitely for a reply). Many such techniques may be utilized to provide responses 514 to requests 502 that fail the score threshold 510 in accordance with the techniques presented herein.

5.3. Score Offset Decay

A third aspect that may vary among embodiments of the presented techniques involves the decaying of the score offset 604 between initiation and application to a second request 502.

Figure 10:
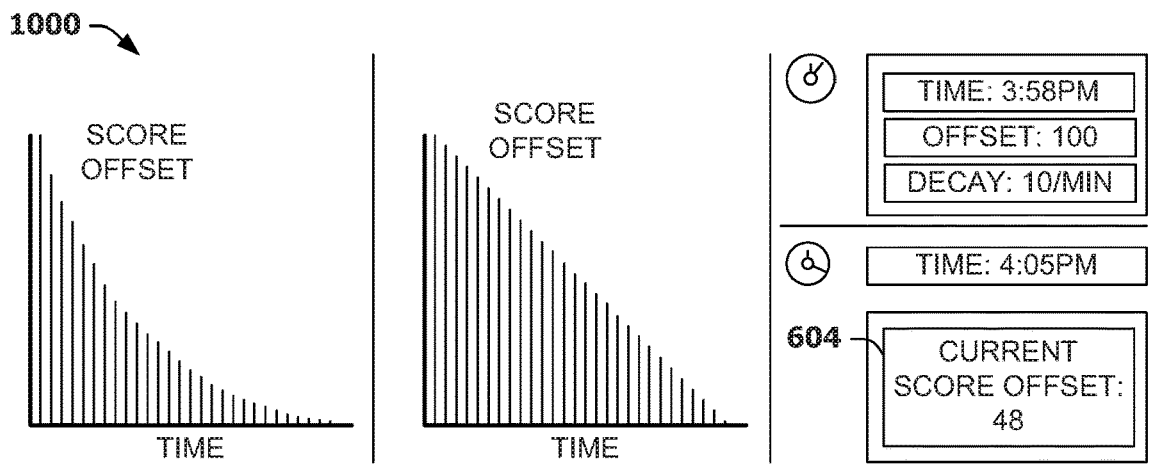
FIG. 10 is an illustration of various techniques for decaying a score offset applied to the evaluation of requests in accordance with the techniques presented herein.

FIG. 10 is an illustration an example scenario 1000 depicting some variations of the score decay that may be applied to a score offset 604. As a first such example, the score decay may be exponential, linear, or any other variation. As a second such example, the score decay may be applied incrementally (e.g., a stored value may be set to an initial score offset 604, and the server 404 may periodically reduce the score offset 604). Alternatively, the server 404 may initiate the score offset 604 by storing a first request time of the first request 502, and, at a second request time of a second request 502, may determine a current score offset 604 that has been decayed at a particular rate since the first time. That is, the server 404 may decay the score offset 604 at the time of the second request 502, and may adjust the second score according to a time difference between the first request time and the second request time. This variation may be desirable, e.g., for scalability; if a server 404 concurrently processes a large volume of requests 502, the subset of requests 502 that fail the score threshold 510 and result in a score offset 604 may respectively result in the initiation of a record with a small number of data items, such as the first request time of the first request 502 (optionally including the score 512 and/or the score threshold 510), and the initial score offset 604 (optionally including the decay rate, e.g., the blocking window over which the score offset 604 is applied to other requests 502). Rather than periodically revisiting the score offsets 604 to apply a decay, the server 404 may simply store the records until later needed, and may discard records that are not followed by a second request 502 by the time the score offset 604 has decayed to an insignificant value. Such variations may also be useful in realtime systems, in which the decay rate and the score offset 604 may be calculated at a precise time of the second request 502. Many such techniques may be utilized to decay the score offset 604 in accordance with the techniques presented herein.

5.4. Application of Score Offset to Other Requests

A fourth aspect that may vary among embodiments of the presented techniques involves the use of a score offset 604 from a first request 502 during the evaluation of a second request 502.

As a first such example, the second request 502 may comprise a subsequently initiated and/or received request by the requester 602. Alternatively, the second request 502 may comprise a concurrently initiated and/or pending request by the requester 602 (e.g., when a requester 602 concurrently submits several requests 502, either independently or related such as part of a transaction, a failure of one such request 502 to satisfy the score threshold 510 may result in a score offset 604 that is applied to the co-pending requests 502). As another alternative, the score offset 604 may be applied retroactively to requests that were previously received from the requester 602; e.g., when a first request that is found to fail the score threshold 510, a previously initiated request 502 may be retroactively evaluated or reevaluated according to the score offset 604. In some cases, a previously completed request 502 may be retroactively negated or diminished, such as reversing updates to an object or revoking access to an object for which the requester 602 was previously granted access.

As a second such example, the score offset 604 may be used to adjust the comparison of the second score 512 of a second request 502 in a variety of ways. For example, the score offset 604 may be added to and/or subtracted from the second score 512 prior to comparison with the score threshold 510. Alternatively, the score offset 604 may be applied to the score threshold 510 prior to comparison with the second score 512.

Figure 11:
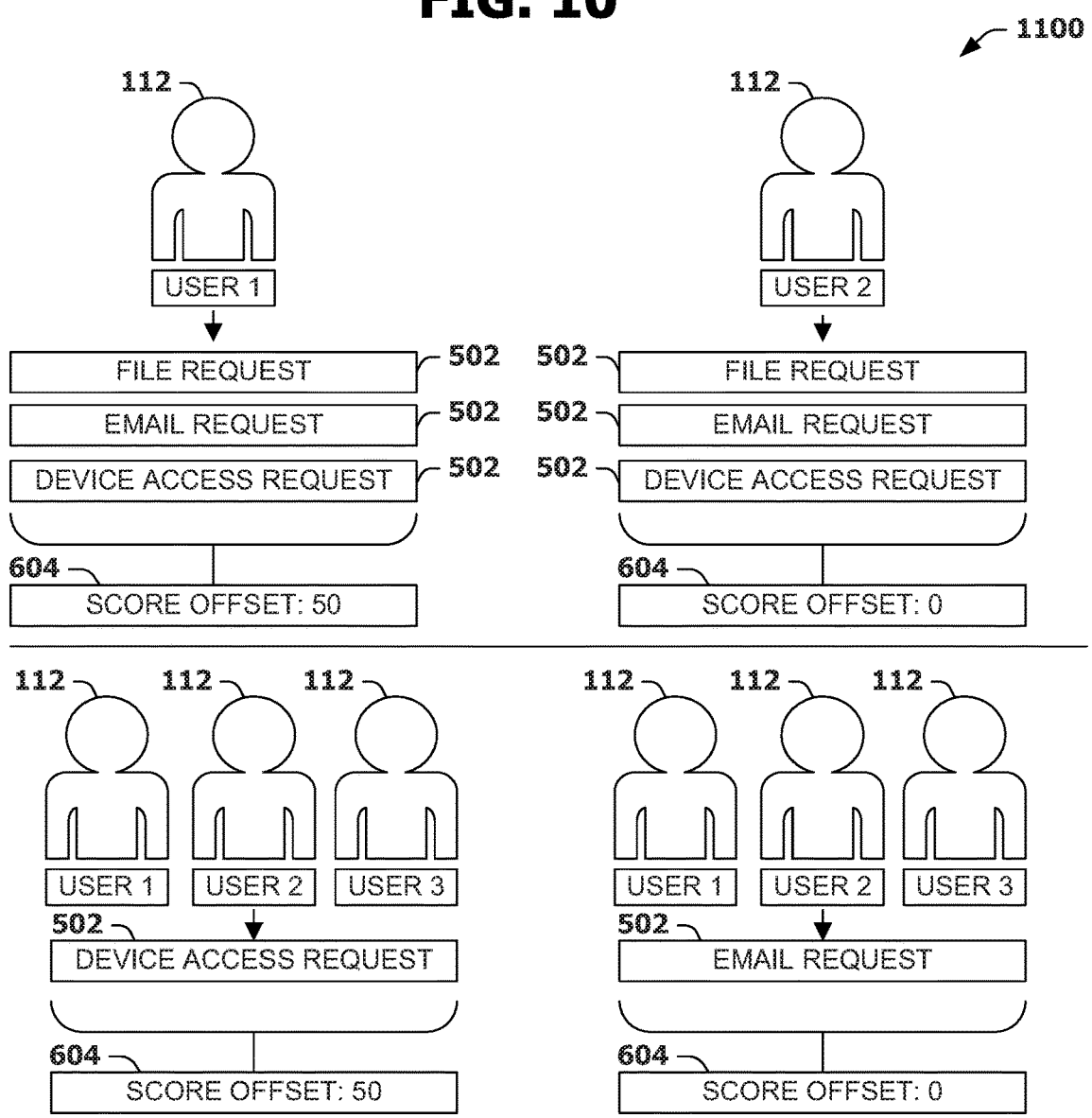
FIG. 11 is an illustration of various techniques for applying score offsets to requests to utilize a service in accordance with the techniques presented herein.

FIG. 11 is an illustration of an example scenario 1100 presenting a third example of this fourth aspect in which different score offsets 604 are applied to different requests 502. As a first such example, the first request 502 and the second request 502 may be submitted by a particular requester 602, such as a particular user 112, a particular user account, or a particular class of user, wherein the score offset 604 resulting from the first request 502 and applied to the second request 502 is specific to the requester 602. The score offset 604 may therefore be applied to many types of requests 502 from the same requester 602, such that any type of request 502 from the second requester 602 is adjusted by the score offset 604 for comparison to the score threshold 510, whereas a different score offset 604 may be applied to requests 502 received from a second requester 602 (including a zero score offset 604 for requesters 602 who have not recently submitted any requests 502 that fail the score threshold 510). This variation may more holistically evaluate the activities of a particular user 112 or type of user 112 who may endeavor to probe and/or exploit a service along multiple aspects, and/or to probe and/or exploit multiple services on the same or different servers 404.

Alternatively or additionally, as a third such example also shown in the example scenario 1100 of FIG. 11, the first request 502 and the second request 502 may be of a particular request type, such as requests through a particular protocol, that target a particular server 404, and/or that involve a particular type of resource, and the score offset 604 resulting from the first request 502 of the request type may be specific to the request type. The score offset 604 may therefore be applied to many requests 502 of the same request type that are received from any requester 602, whereas a different score offset 604 may be applied to requests 502 of a different request type (including a zero score offset 604 for requests 502 that are not similar to any other request 502 that has recently failed the score threshold 510). This variation may more holistically evaluate a particular type of activity, e.g., where a user 112 may attempt to target a particular resource through a variety of user accounts, such as in the manner of a distributed denial-of-service (DDoS) attack. Many such techniques may be utilized to group, cluster, or "roll up" requests 502 along various dimensions, and to evaluate all such requests 502 in a consolidated matter (such that a failure of the score threshold 510 by any one such request 502 results in a score offset 604 by which other such requests 502 are adjusted).

Figure 12:
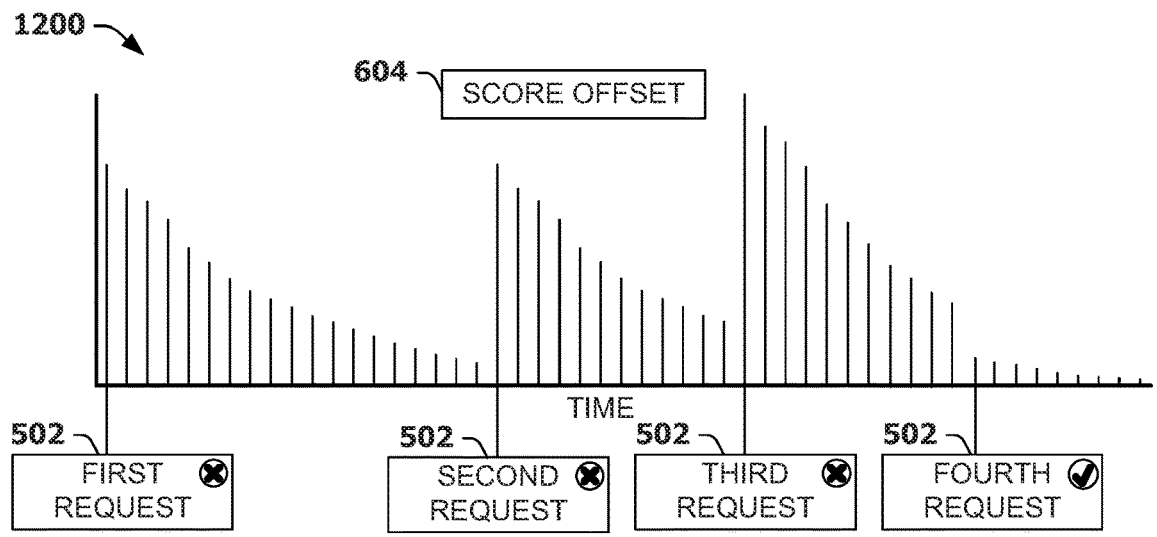
FIG. 12 is an illustration of an example scenario featuring an adjustment of a score offset in view of a series of requests in accordance with the techniques presented herein.
Figure 13:
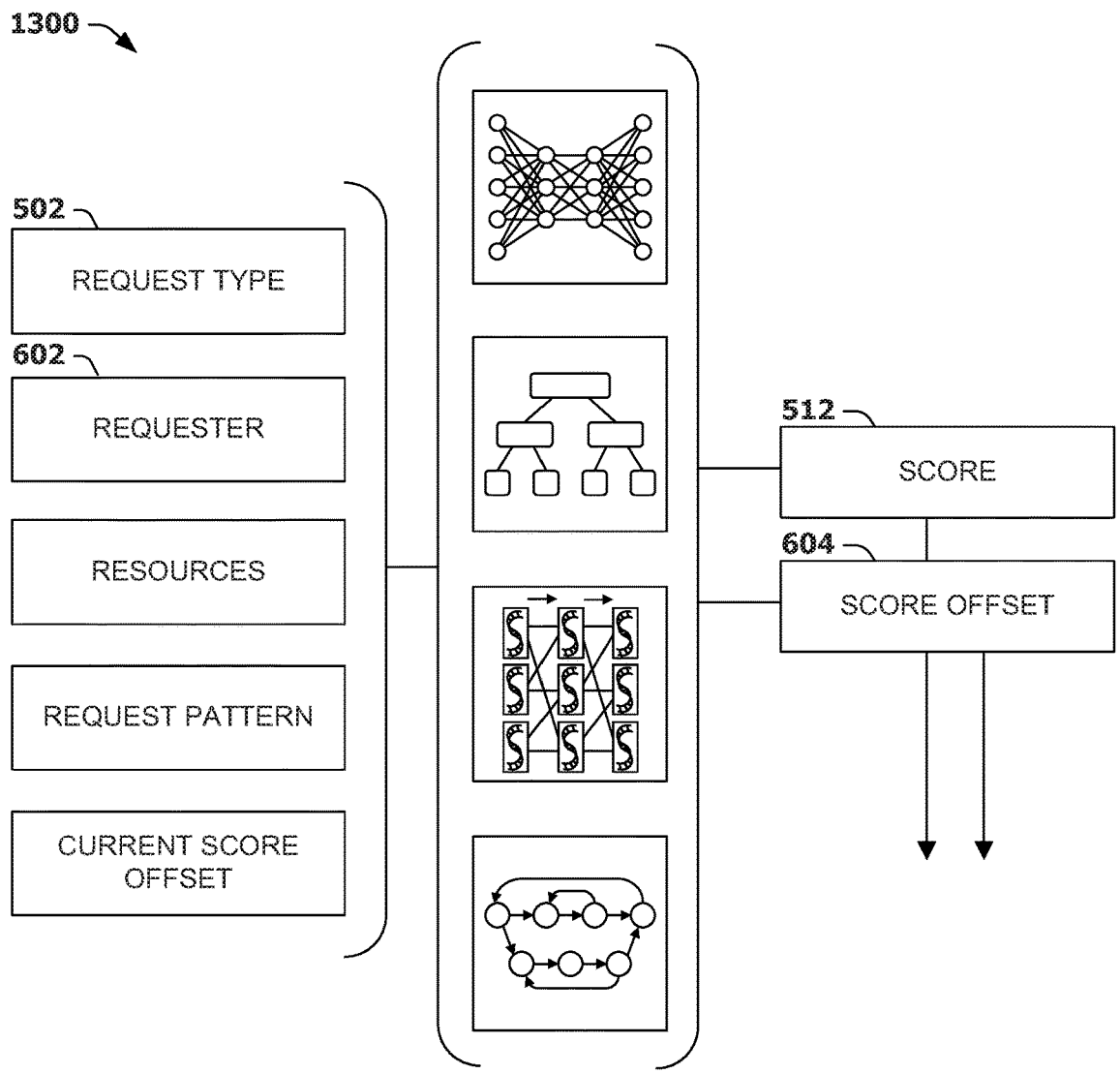
FIG. 13 is an illustration of an example scenario featuring a variety of adaptive evaluation techniques that evaluate requests to utilize a service in accordance with the techniques presented herein.

FIG. 12 is an illustrate of an example scenario 1200 depicting a fourth such example, wherein a server 404 further adjusts the score offset 604 according to the comparison of a second request 502 (adjusted by a current score offset 604) with the score threshold 510. In this example scenario 1200, as a first time, a first request 502 fails the score threshold 510 resulting in an initiation of the score offset 604 to an initial score offset value. The score offset 604 decays over time, but before it has decayed to an insignificant value, a second request 502 is received that, when compared with the score threshold 510 in view of the score offset 604, also results in a determination that the second request 502 also fails the score threshold 510. In response, the server 404 resets the score offset 604 to the initial score offset value. At a third time, a third request 502 is received that, when compared with the score threshold 510 in view of the score offset 604, also results in a determination that the third request 502 also fails the score threshold 510. In this example, the score offset 604 is set above the initial score offset value, e.g., as a reflection of repeated violations of the score threshold 510, which may indicate a pattern of activity suggesting a probing 516 of the protective mechanisms of the server 404. Alternatively or additionally, repeated violations may result in decreasing the decay rate of the score offset 604, which may enable a series of attempts to violate the usage policy 506 to cause persisted suspicion in the future activities of the user 112.

The example scenario 1200 of FIG. 12 also illustrates a fifth such example, in which, at a fourth time, a fourth request 502 is received that, even despite the inclusion of the score offset 604 in the comparison of the score 512 with the score threshold 510, results in a determination that the request 502 is within the score threshold 510 and therefore complies with the usage policy 506. In response, the server 404 may reduce the score offset 604 as a measure of restoration of trust in the user 112. This technique may be advantageous, e.g., for mitigating the effects of false positives that may lead to unfair automatic determinations that some legitimate requests 502 violate the usage policy 506. However, such techniques may also be exploited by users 112 in the context of probing 516 (e.g., by following a denied request 502 with a number of innocuous requests 502 in order to reduce or terminate the score offset 604 more rapidly), and it may be advantageous to apply such reduction of the score offset 604 in a modest and/or limited manner.

As a sixth such example, an embodiment of the presented techniques may endeavor to obscure the score offset 604 from a requester 602. As previously noted, randomization may be utilized in initiating the score offset 604, including the score decay. Additionally, randomization may be applied during each subsequent comparison with a second or future request 502 with the score threshold 510 in view of the score offset 604, including whether or not to apply the score offset 604 at all to adjust the comparison. Such randomization may deter users 112 seeking to understand and model the protective mechanisms of the server 404 in furtherance of efforts to exploit the service. Many such techniques may be utilized to apply a previously initiated score offset 604 to the evaluation of requests 502 in accordance with the techniques presented herein.

5.5. Adaptive Learning Techniques

A fifth aspect that may vary among embodiments of the presented techniques involves the use of adaptive learning techniques in the provision of services, including the determination of scores 512 and/or application of score offsets 604 in accordance with the techniques presented herein.

FIG. 12 is an illustration of an example scenario 1200 in which a variety of heuristics 508 are utilized to evaluate requests 502 to determine compliance with a usage policy 506 involve the use of adaptive learning techniques that may be trained to recognize patterns of activity, such as propagation and/or recurrent artificial neural networks; Bayesian statistical classification; and genetic algorithms. In some scenarios, an ensemble of such adaptive learning techniques may be utilized to provide different forms of adaptivity. A server 404 may comprise one or more adaptive heuristics 508 of this nature that generate scores 512 for requests 502 according to the usage policy 506 of the service, which may have been developed, e.g., using past determinations of requests 502 and/or training data sets that provide expected determinations of compliance with the usage policy 506 for template requests 502. The adaptive learning techniques may utilize a variety of inputs, such as a request type of the request 502, the identity of the requester 602, the resources involved in the request, a pattern of activity in which the request 502 arises, and/or the current score offset 604 that is applicable to the request 502. In addition to generating scores 512 for new requests 502, adaptive heuristics may also be further adapted using such determinations; e.g., the determination for a first request 502 may be used to train or retrain the adaptive heuristic. Such training may enable, e.g., a clustering of similar determinations and responses 514 for similar requests 502, which may promote the consistency of the determinative process across a wide range of requests 502, wherein the adaptive heuristic to recognize that requests 502 similar to the first request 502 also fail to comply with the usage policy 506. The adaptive heuristics may provide a variety of outputs, such as the score 512 of the request 502 and/or a score offset 604 to be initiated in case the score 512 fails the score threshold 510. Alternatively or additionally, in a recurrent model, the outputs of the adaptive heuristics may be provided as inputs to a next instantiation of the adaptive heuristics (e.g., allowing for the evaluation of a series of requests 502 in the manner of a state diagram). Many such techniques may be devised that utilize adaptive heuristics in the implementation of the techniques presented herein.

6. Usage of Terms

Although the subject matter has been described in language specific to structural features and/or methodological acts, the subject matter defined in the appended claims is not necessarily limited to the specific features or acts described above. Rather, the specific features and acts described above are disclosed as example implementations of the claims.

Although the disclosed subject matter has been shown and described with respect to one or more implementations, equivalent alterations and modifications may occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application.

The claimed subject matter may be implemented in various ways, such as a method, an apparatus, or an article of manufacture. Each such implementation may utilize standard programming and/or engineering techniques to produce software, firmware, hardware, or any combination thereof to control a computer to implement the disclosed subject matter. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

As used herein and unless specified otherwise or clear from context, terms such as "and", "or", or "and/or," may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense.

As used herein and unless specified otherwise or clear from context, the term "or" is intended to mean an inclusive "or" rather than an exclusive "or".

As used herein and unless specified otherwise or clear from context, the terms "a," "an," or "the" may convey either a singular usage or a plural usage.

As used herein and unless specified otherwise or clear from context, the terms "first," "second," etc. are not intended to imply a temporal aspect, a spatial aspect, an ordering, etc. Rather, such terms are merely used as identifiers, names, etc. for features, elements, items, etc. For example, the terms "a first object" and "a second object" generally correspond to object A and object B, or two different objects, or two identical objects, or the same object.

As used herein and unless specified otherwise or clear from context, the terms "includes", "having", "has", "with", and variants thereof are used in either the detailed description or the claims, such terms are intended to be inclusive in a manner similar to the term "comprising."

As used herein and unless specified otherwise or clear from context, the phrase "at least one of," such as "at least one of A and B," generally means A, or B, or both A and B.

As used herein and unless specified otherwise or clear from context, the term "example" is used herein to mean serving as an example, instance, illustration, etc., and not necessarily as advantageous. Any aspect or design described herein as "example" is not necessarily to be construed as advantageous over other aspects or designs. Rather, use of the word example is intended to present concepts in a concrete fashion.

As used herein and unless specified otherwise or clear from context, the term "based on" may be understood as not necessarily intended to convey an exclusive set of factors and may, instead, allow for existence of additional factors not necessarily expressly described, again, depending at least in part on context.

As used herein and unless specified otherwise or clear from context, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

As used herein and unless specified otherwise or clear from context, the term "article of manufacture" as used herein is intended to encompass a computer program accessible from any computer-readable device, carrier, or media.

The invention claimed is:

1. A method of providing a service by a device comprising a processor, the method comprising:
   executing, by the processor, instructions that cause the device to:
      for a first request from a first requester:
         determine a first score indicating whether the first request complies with a usage policy of the service;
         determine whether to fulfill the first request by comparing the first score with a score threshold; and
         responsive to the first score failing the score threshold, initiate a score offset;
      decay the score offset over time;
      for a second request from the first requester:
         determine a second score for the second request; and
         determine whether to fulfill the second request by comparing the second score adjusted by the score offset to the score threshold;
      for a first request from a second requester:
         determine a third score for the first request from the second requester; and
         determine whether to fulfill the first request from the second requester by comparing the third score to the score threshold; and
      for a second request from the second requester:
         determine a fourth score for the second request from the second requester; and
         determine whether to fulfill the second request from the second requester by comparing the fourth score to the score threshold.

2. The method of claim 1, wherein executing the instructions further causes the device to, responsive to the second request from the first requester failing the score threshold, increase the score offset.

3. The method of claim 2, wherein:
   initiating the score offset further comprises: setting the score offset to an initial score offset value; and
   increasing the score threshold further comprises: resetting the score offset to the initial score offset value.

4. The method of claim 2, wherein:
   initiating the score offset further comprises: setting the score offset to an initial score offset value; and
   increasing the score threshold further comprises: increasing the score offset above the initial score offset value.

5. The method of claim 1, comprising:
   determining to fulfill the first request from the second requester based upon the comparison of the third score to the score threshold.

6. The method of claim 1, wherein:
   the first request from the first requester and the second request from the first requester are of a request type;
   the score offset is specific to the request type; and
   determining whether to fulfill the second request from the first requester further comprises: comparing, to the score threshold, the second score adjusted by the score offset specific to the request type.

7. The method of claim 1, wherein:
   evaluating the first request from the first requester further comprises: evaluating the first request from the first requester using a heuristic; and
   evaluating the second request from the first requester further comprises:
providing the score offset as an input to the heuristic.

8. The method of claim 1, wherein:
   decaying the score offset over time further comprises: decaying the score offset according to a decay rate; and
   executing the instructions further causes the device to, responsive to the second request from the first requester failing the score threshold, decrease the decay rate of the score offset.

9. The method of claim 1, wherein executing the instructions further causes the device to, responsive to determining that the second request from the first requester adjusted by the score offset satisfies the score threshold, reducing the score offset.

10. The method of claim 1, wherein:
    executing the instructions further causes the device to obscure the score offset from the first requester.

11. A nontransitory computer-readable medium storing instructions that, when executed by a processor of a device, cause the device to provide a service by:
    for a first request from a first requester:
       determining a first score indicating whether the first request complies with a usage policy of the service;
       determining whether to fulfill the first request by comparing the first score with a score threshold; and
       responsive to the first score failing the score threshold, initiating a score offset;
    decaying the score offset over time;
    for a second request from the first requester:
       determining a second score for the second request; and
       determining whether to fulfill the second request by comparing the second score adjusted by the score offset to the score threshold;
    for a first request from a second requester:
       determining a third score for the first request from the second requester; and determining whether to fulfill the first request from the second requester by comparing the third score to the score threshold; and for a second request from the second requester:
determining a fourth score for the second request from the second requester; and
determining whether to fulfill the second request from the second requester by comparing the fourth score to the score threshold.

12. The nontransitory computer-readable medium of claim 11, wherein:
the device further comprises an adaptive heuristic that generates scores for requests according to the usage policy of the service; and
the instructions, when executed by the processor, further cause the device to, responsive to the first score failing the score threshold, train the adaptive heuristic using the first request from the first requester.

13. The nontransitory computer-readable medium of claim 12, wherein training the adaptive heuristic further comprises: training the adaptive heuristic to recognize that one or more requests similar to the first request from the first requester fail to comply with the usage policy.

14. The nontransitory computer-readable medium of claim 12, wherein training the adaptive heuristic further comprises: training the adaptive heuristic to choose score offsets for one or more requests that are similar to the first request from the first requester.

15. A server that provides a service, the server comprising:
a processor; and
a memory storing instructions that, when executed by the processor, cause the server to:
for a first request from a first requester:
determine a first score indicating whether the first request complies with a usage policy of the service;
determine whether to fulfill the first request by comparing the first score with a score threshold; and
responsive to the first score failing the score threshold, initiate a score offset;
decay the score offset over time;
for a second request from the first requester:
determine a second score for the second request; and
determine whether to fulfill the second request by comparing the second score adjusted by the score offset to the score threshold;
for a first request from a second requester:
determine a third score for the first request from the second requester; and
determine whether to fulfill the first request from the second requester by comparing the third score to the score threshold; and
for a second request from the second requester:
determine a fourth score for the second request from the second requester; and
determine whether to fulfill the second request from the second requester by comparing the fourth score to the score threshold.

16. The server of claim 15, comprising:
choosing a failure response for at least one request according to a score difference between at least one score of the at least one request and the score threshold.

17. The server of claim 15, wherein initiating the score offset further comprises: initiating at least one score offset that is proportional to a difference between the first score and the score threshold.

18. The server of claim 15, wherein initiating the score offset further comprises: at least partially randomizing the score offset.

19. The server of claim 15, wherein decaying the score offset further comprises: at a selected frequency, incrementally reducing the score offset.

20. The server of claim 15, wherein:
initiating the score offset further comprises: storing a first request time of the first request from the first requester; and
decaying the score offset further comprises:
identifying a second request time of the second request from the first requester; and
decaying the score offset by which the second score is adjusted according to a time difference between the first request time and the second request time.

* * * * *